June 11, 1935. M. POSER 2,004,798

METHOD AND MEANS FOR ILLUMINATING SURFACES

Filed March 2, 1933

MAX POSER
INVENTOR

BY *J. A. Ellestad*
ATTORNEY

Patented June 11, 1935

2,004,798

UNITED STATES PATENT OFFICE 2,004,798

METHOD AND MEANS FOR ILLUMINATING SURFACES

Max Poser, Rochester, N. Y., assignor to Bausch & Lomb Optical Company, Rochester, N. Y., a corporation of New York Application March 2, 1933, Serial No. 659,275

2 Claims. (Cl. 240—1)

This invention relates to a method and means for producing substantially uniform illumination on a substantially plane surface such as a tangent screen, map, painting, chart or the like.

One of the objects of my invention is to provide an improved method and means for producing substantially uniform illumination on a surface. Another object is to provide a method and means for uniformly illuminating a relatively large plane surface by means of a single light source. Another object is to provide a method and means for uniformly illuminating a relatively large plane surface by means of a single light source which is eccentrically positioned in relation thereto. These and other objects and advantages reside in certain novel features of construction, arrangement and combination of parts and in the method of constructing and arranging same as will hereinafter be more fully described.

Referring to the drawing.

Great difficulty is experienced when attempts are made to provide uniform illumination on a relatively large surface such as a tangent screen, map, painting, chart or the like. Such illumination must, of course, be provided without obstructing the view of the screen, map, painting or the like. Uniform illumination of such an object as a map or chart, for example, is generally to be desired when such objects are to be photographed or copied. Tangent screens which are used by oculists for plotting vision fields of patients must also be uniformly illuminated.

Figure 1:
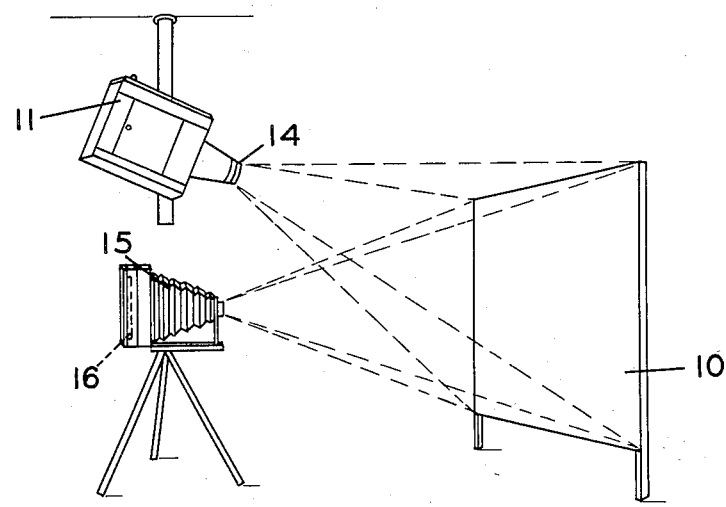
Fig. 1 is a view illustrating the method of making my improved filter.

By means of my invention I am able to illuminate uniformly such objects as tangent screens, maps, charts and the like. My method comprises the steps of illuminating the surface, making a variable density filter by photographing the surface and then placing this filter in front of the illuminator. The method of making the filter is illustrated in Fig. 1 wherein 10 indicates an object having a relatively large plane surface to be illuminated. A suitable projector 11, eccentrically mounted above the central plane of the object 10, is arranged to illuminate the surface of the object. The projector 11 comprises a light source 12, condensers 13 and an objective 14. Since the upper part of the object 10 is closest to the projector 11, the illumination on the upper part will be more intense than at the bottom and the intensity of illumination will vary gradually from top to bottom. A camera 15, carrying a suitable sensitized element 16, is then positioned concentrically to the illuminated object 10 and an exposure is made. Upon developing the exposed element 16 it will be found that the negative has a density which varies gradually from top to bottom in the same manner as the illumination on object 10 varies from bottom to top. This is due, of course, to the fact that the camera lens produces an inverted image on the negative.

Figure 2:
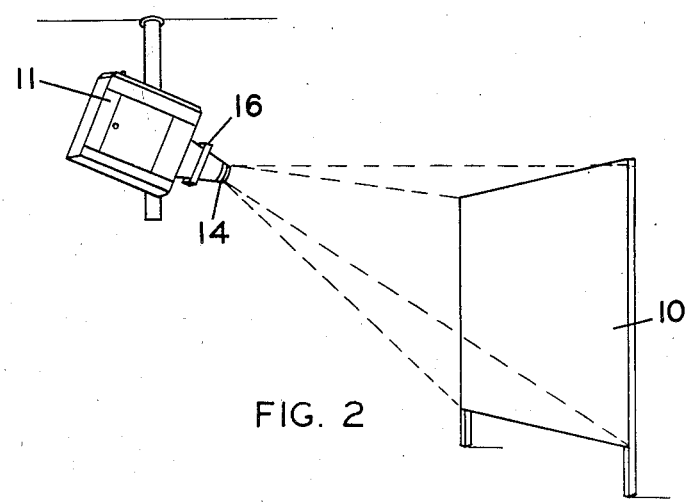
Fig. 2 shows the method of illuminating a surface with my filter in use.
Figure 3:
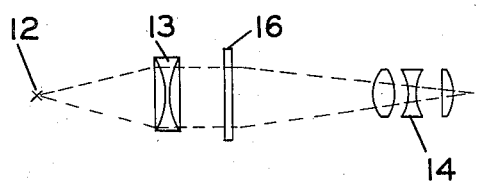
Fig. 3 is a diagrammatic view of the optical system employed in the projector of Fig. 2.

The negative 16 having a variable density is then used as a filter and is positioned in the projector 11 as shown in Figs. 2 and 3. In placing the filter 16 in the projector the densest part of the filter is placed at the bottom. The rays which pass from the light source 12 through the densest part of the filter will be directed to the top of the object 10 by the action of the objective 14. Hence the variation in illumination intensity from top to bottom of object 10 will be substantially compensated for by the filter 16 which will have a density which varies as the illumination on object 10 when illuminated by projector 11 without the filter in place. As a consequence, the illumination will be substantially uniform over the surface of object 10. If desired, several filters could be made from one negative by making photographic contact prints.

From the foregoing, it will be apparent that I am able to attain the objects of my invention and provide an improved method and means for illuminating substantially uniformly a relatively large surface. By this method a relatively large surface can be uniformly illuminated by means of a single light source. Various modifications can obviously be made without departing from the spirit of my invention.

I claim:

1. A method of providing substantially uniform illumination for a relatively large surface, which comprises projecting light rays onto said surface from a single fixed source, making a filter having a gradually varying density from one side to another by photographing said illuminated surface, placing said filter before said light source and projecting light rays through said filter onto said surface, the densest part of the filter being positioned in the path of light rays which fall on that part of the surface which is closest to the source.

2. A method of providing substantially uniform illumination for a surface, which comprises projecting light rays onto said surface at an oblique angle from a single fixed source, making a filter having a gradually varying density from one side to another by photographing said illuminated surface from a point on its normal central axis, placing said filter before said light source and projecting light rays through said filter onto said surface, the densest part of the filter being positioned in the path of light rays which fall on that part of the surface which is closest to the source.

MAX POSER.